United States Patent

Ambs

[11] Patent Number: 6,076,630
[45] Date of Patent: Jun. 20, 2000

[54] ACOUSTIC ENERGY SYSTEM FOR MARINE OPERATIONS

[75] Inventor: Loran D. Ambs, Fulshear, Tex.

[73] Assignee: Western Atlas International, Inc., Houston, Tex.

[21] Appl. No.: 09/244,853

[22] Filed: Feb. 4, 1999

[51] Int. Cl.[7] ................................................. G01V 1/00
[52] U.S. Cl. .................. 181/110; 181/101; 181/108; 181/110; 181/113; 181/119; 181/120; 367/14; 367/15; 367/19; 367/140; 367/141
[58] Field of Search .................................. 181/101, 108, 181/110, 113, 119, 120; 367/14, 15, 19, 140, 141

[56] References Cited

U.S. PATENT DOCUMENTS

| | | | |
|---|---|---|---|
| 4,706,230 | 11/1987 | Inoue et al. | 367/174 |
| 4,964,106 | 10/1990 | Bromfield | 367/165 |
| 4,970,706 | 11/1990 | Tocquet et al. | 367/158 |
| 5,126,979 | 6/1992 | Rowe, Jr. et al. | 367/175 |
| 5,345,428 | 9/1994 | Arnold et al. | 367/165 |
| 5,357,486 | 10/1994 | Pearce | 367/159 |
| 5,926,439 | 7/1999 | Piquette | 367/161 |

*Primary Examiner*—David S. Martin
*Assistant Examiner*—Edgardo San Martin
*Attorney, Agent, or Firm*—Alan J. Atkinson

[57] ABSTRACT

A marine seismic source for generating acoustic source energy. A housing has a continuous exterior perimeter which is moveable to displace water. Movement of the housing can be accomplished by providing alternating convex and concave exterior surfaces connected with inflection points. The composite shape provides movement inwardly or outwardly, and can be moved with different types of actuators. Piezoelectric elements can be activated to move the housing surfaces and to change the internal housing volume. The resulting pressure pulse provides acoustic source energy useful for the evaluation of subterranean geologic formations and for other purposes.

17 Claims, 3 Drawing Sheets

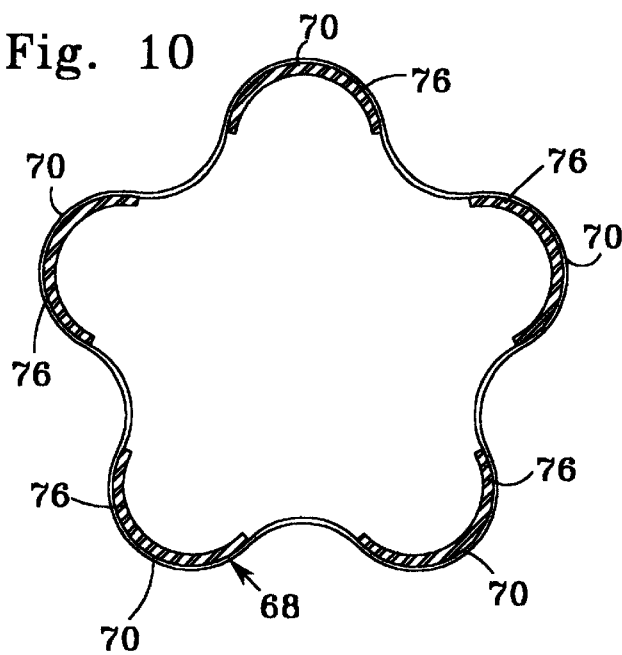
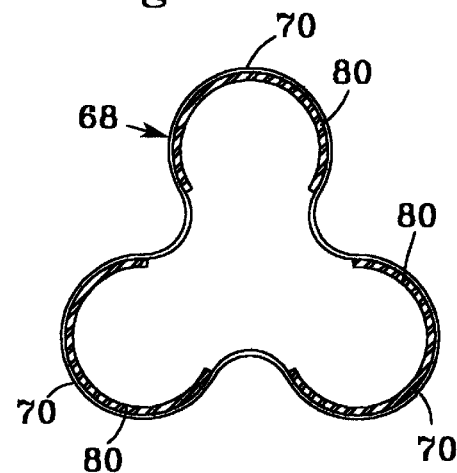
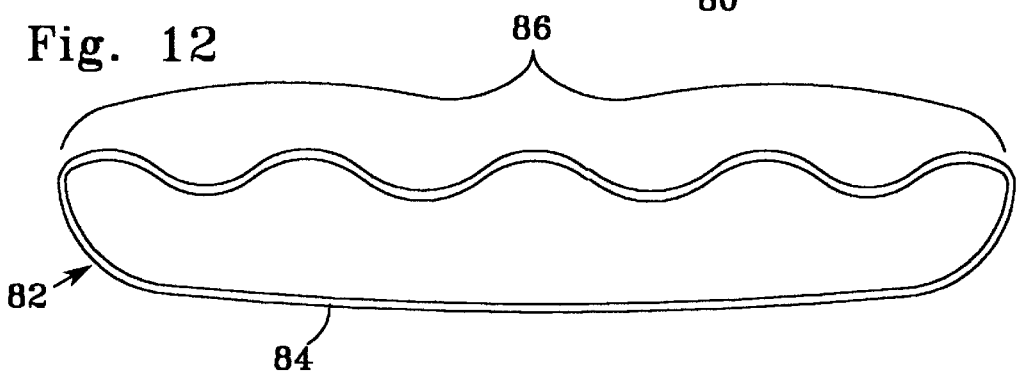
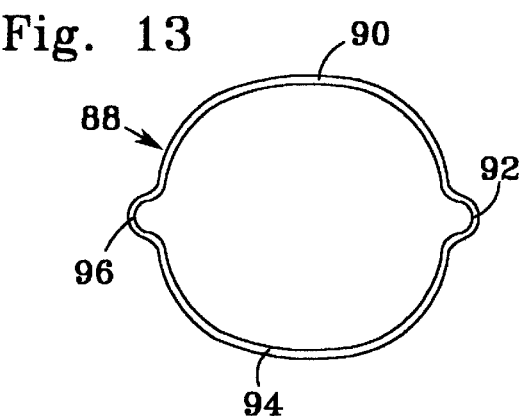

ACOUSTIC ENERGY SYSTEM FOR MARINE OPERATIONS

BACKGROUND OF THE INVENTION

The invention described herein relates to the field of acoustic energy sources used in geophysical exploration and other marine operations. More particularly, the invention relates to an improved acoustic energy source system operable to generate low frequency seismic source energy in water.

Marine seismic vessels tow vibrators and discharge air guns, explosives and other acoustic projectors to generate seismic source energy in marine geophysical operations. The seismic source energy comprises a pressure pulse which travels downwardly through the water and underlying subsurface geologic structures. The source energy is partially reflected from interfaces between the geologic structures and is detected with geophone or hydrophone sensors.

Conventional source signals for marine geophysical operations are generated with acoustic sources such as compressed air guns. U.S. Pat. No. 4,180,139 to Walker (1979), U.S. Pat. No. 4,285,415 to Paitson (1981), and U.S. Pat. No. 5,228,010 to Harrison (1993) disclosed different mechanisms for discharging compressed air into water to generate acoustic source energy.

U.S. Pat. No. 3,896,889 to Bouyoucos (1975) disclosed a mass oscillation system for generating acoustic source energy in water. Other devices generate an acoustic signal by transmitting high velocity water jets in the underwater water environment. U.S. Pat. No. 4,131,178 to Buoyoucos (1978) and U.S. Pat. No. 4,153,135 to Bouyoucos (1975) disclosed a moveable piston for generating high velocity water jets.

Other acoustic energy sources have been developed for sonar and other vessel detection systems. U.S. Pat. No. 4,651,044 to Kompanek (1987) disclosed a sonar transducer formed having a plurality of sectionalized piezoelectric elements attached to the interior wall of a slotted cylinder. Each element was constructed with a ceramic material having piezoelectric characteristics and was bonded with adhesive to the interior cylinder wall.

Slotted cylinder transducers require the slot to permit expansion and contraction of the cylinder as the transducer elements vibrate the cylinder. For underwater applications, a flexible watertight skin covers the slot as the cylinder expands and contracts. In the absence of a pressure compensation system, the hydrodynamic pressure of the water can compress the cylinder and cause the slot to close. The transducer is inoperable when this occurs.

Other variations and improvements to acoustic energy sources have been developed. U.S. Pat. No. 5,122,992 to Kompanek (1992) disclosed a transducer member having a closure member extending in a U-shaped configuration, and U.S. Pat. No. 5,267,223 to Flanagan et al. (1993) disclosed a compliant cover bonded to a transducer shell. Another application of slotted cylinders was disclosed in U.S. Pat. No. 5,592,359 to Kompanek (1997), wherein two slotted cylinders were fastened together for the purpose of separating oil from sediment.

Conventional seismic sources require a number of air guns to produce an acceptable source level in the desired frequency band. The large number of constituent air guns, connecting hardware, and air hose bundle supplying the air guns adds significant weight and frictional drag to towed arrays. Slotted cylinder and other conventional acoustic energy sources for underwater vessel detection operate at frequencies and power ranges unsuitable for geophysical operation. Accordingly, there is a need for an improved source generator for use in marine operations. The generator should be adaptable to different source energy requirements and should be easy to manufacture and deploy.

SUMMARY OF THE INVENTION

The invention discloses an acoustic energy source for generating a pressure pulse in water. The apparatus comprises a housing deployable in the water and having an exterior surface closed about at least one housing perimeter having at least two inflections. The housing is flexible about said housing perimeter to generate a pressure pulse in the water by changing the enclosed housing volume. An actuator is in communication with said housing for flexing the housing about the housing perimeter to generate the pressure pulse in the water. In other embodiments of the invention, the housing can have multiple shapes and can move inwardly or outwardly to generate the pulse.

The method of the invention provides a technique of operating a marine source to generate a pressure pulse in water. The method comprises the steps of deploying a housing in the water, wherein the housing has an exterior surface closed about at least one housing perimeter, of activating an actuator engaged with the housing to flex the housing exterior surface about said housing perimeter to generate a pressure pulse, and of returning said housing exterior surface to the original configuration.

BRIEF DESCRIPTION OF THE DRAWINGS

FIG. 10 illustrates a housing having five lobes which are actuated with piezoelectric bending elements.

FIG. 11 illustrates another form of housing.

FIG. 12 illustrates a housing having a crenelated surface.

FIG. 13 illustrates a housing having curved surfaces with various radii.

DESCRIPTION OF THE PREFERRED EMBODIMENTS

Figure 1:
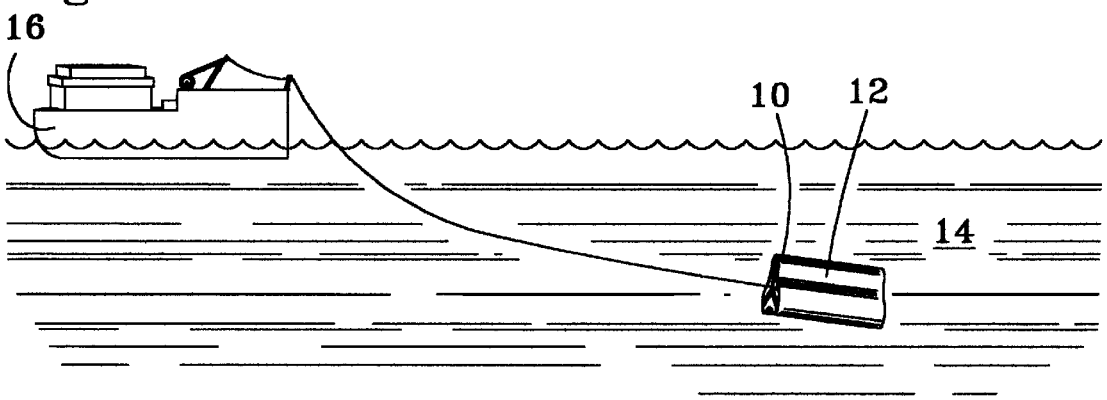
FIG. 1 illustrates an acoustic source apparatus towed behind a seismic vessel.

The invention provides an improved energy source for use in marine operations. The invention is particularly useful in generating seismic source energy as described below. Referring to FIG. 1, acoustic source apparatus 10 is illustrated as comprising housing 12 deployed in water 14 from seismic vessel 16. Apparatus 10 can be neutrally buoyant, powered or unpowered, controlled remotely or autonomously, and can be integrated with control equipment known in the art to maneuver horizontally, vertically, or laterally in water 14. Apparatus 10 provides a source of acoustic energy suitable for investigating subsurface geologic formations.

Figure 2:
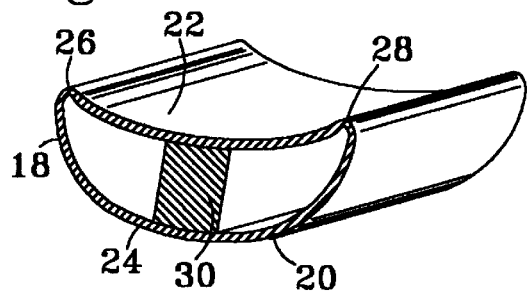
FIG. 2 illustrates a housing having a concave surface and a convex surface.

FIG. 2 illustrates one embodiment of the invention wherein housing 18 is illustrated in partial section. Housing 18 uses surfaces of alternating shape or curvature to change the volume displaced by housing 18, and is sufficiently flexible to permit displacement of water volume. As used herein, the terms "flexure" and "flexible" mean the capability to bend, twist, curve, move, or turn without breaking. In a preferred embodiment of the invention, the term flexible also includes the elastic capacity to return to an original position or configuration without operation of additional force.

The term "housing" as used herein can refer to any configuration which permits relative movement between two different points on housing. Movement in a radial or other direction by any parts of housing will result in a net change in enclosed volume and will generate acoustic source energy in water suitable for marine seismic operations. To generate larger amounts of source energy, and assuming the amount of surface area displacement is equal, movable housings having larger surface areas or larger displacements will generate more source energy than housings having lesser surface areas or lesser displacement. Each housing can also be configured to affect the mechanical characteristics of the transducer, and the acoustic energy pulse characteristics resulting from the transducer. In other embodiments, housings can be shaped irregularly so that movement of the housings in response to activation of transducer elements deforms part of the housing to a degree greater than the deformation of other parts. Since natural resonance of each housing is partly dependent upon the housing diameter and shape, the transducer efficiency can be tailored by selective shaping of the housing. A cylindrical housing having a constant diameter along an axis would have a higher "Q" factor than would a housing of variable diameter.

Although each housing includes a closed perimeter bounding at least one plane segment through the interior volume of the housing, other parts of a housing could be serrated or cut to permit different housing movement. The housing does not have to be a fully enclosed, contained structure provided that one plane segment defines a continuous, closed perimeter. This flexibility in design permits controlled movement along the closed housing perimeter while permitting greater movement at one or more ends of the housing. This flexibility in configuration permits tuning regarding the shape and size of a pressure pulse in water 14.

In a preferred embodiment of the invention, the water 14 volume is displaced by expansion of the internal housing 18 volume without changing the surface area of housing 18 in contact with water 14. As shown in FIG. 2, housing 18 forms a continuous exterior surface 20 about the perimeter identified in cross-section through housing 18. The perimeter of housing 18 is described as a closed curve bounding a plane perpendicular to an axis through housing 18. Housing 18 has multiple (theoretically an infinite number) planes intersecting the interior space of housing 18, and multiple perimeters bounding each plane segment. Housing exterior surface 20 has concave outward surface 22 and convex outward surface 24 connected by at least two inflection points 26 and 28 (identified as rounded curves in FIG. 2) along continuous exterior surface 20. Inflection points are used herein as describing a turn or change in position, course or alignment, and also include the mathematical definition as the point bounding a concave and convex curve or arc. In other embodiments of the invention wherein shapes other than curves form the housing perimeter, the term "inflection" as used herein means any variation in the shape of the housing perimeter.

Figure 3:
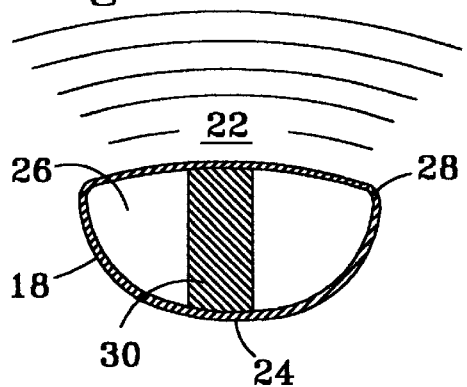
FIG. 3 illustrates the housing after the actuator has been activated.

Actuator 30 is positioned within housing 18 and is activatable as shown in FIG. 3 to modify the shape of housing exterior surface 20. When actuator 30 is activated, concave surface 22 is altered to generate a pressure pulse in water 14 in the indicated direction as shown in FIG. 3. The shape of convex surface 24 is altered correspondingly to accommodate such movement, and the change in shape at any point along housing exterior surface 20 depends on the local shape of exterior surface 20, and on the quantity and direction of the activating force provided by actuator 30. Actuator 30 can be activated to return housing 18 to the original configuration shown in FIG. 2, or the material and shape of housing 18 can cooperate to elastically return housing 18 to the original configuration. In the example illustrated, the change in the cross-sectional shape of exterior surface 20 occurs without changing the surface area of exterior surface 20 in contact with water 14. However, the altered shape changes the volume within housing 18, which displaces water 14 to generate a pressure pulse.

Figure 4:
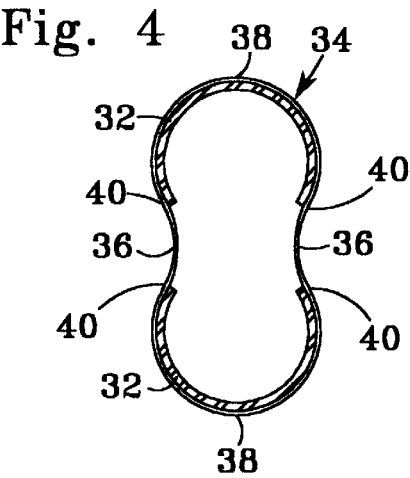
FIG. 4 illustrates an hourglass shaped housing.

Actuator 30 can comprise a mechanical, electromechanical, pneumatic, hydraulic, electric, or other device suitable for flexing housing 18. Actuator 30 can comprise piezoelectric transducers attached to the interior or exterior surface of housing 18. FIG. 4 illustrates one embodiment of the invention wherein piezoelectric elements 32 are attached to the interior surface of housing 34. Housing 34 is generally shaped in an hourglass configuration. Depending on the expansion or contraction of piezoelectric elements 32, the radii of the curved portions of housing 34 will be increased or decreased to change the volume within housing 34. Water 14 is displaced regardless of whether the curved portions of housing 34 move inwardly or outwardly to produce an acoustic pressure pulse in water 14. Accordingly, the illustration shown in FIG. 4 can comprise the initial position of housing 34 or can comprise the position of housing 34 after piezoelectric elements 32 have been activated.

Housing 34 in FIG. 4 is moved to produce the desired vibration by activating piezoelectric element or elements 32 attached to the outside or exterior surface of housing 34, or within the interior of a composite structure as described below. "Piezoelectric" refers to the generation of electric polarity in dielectric crystals subjected to mechanical stress, and to the generation of stress in such crystals when subjected to an applied voltage. Piezoelectric element 32 can be formed from a single element or from a series or combination of piezoelectric elements 32. As defined herein, references to a single piezoelectric element 32 means one or more elements.

When an electric potential is applied to piezoelectric elements 32 to expand such elements, piezoelectric elements 32 force the housing to expand radially outwardly. Such radial movement changes the volume of the housing to produce a pressure field or pulse in water 14. In other embodiments where the piezoelectric elements 32 are located on the opposite side of housing 34, such actuation could move the perimeter of the housing inwardly. In either event, the pressure pulse generated by the change in volume provides acoustic seismic source energy sufficient for penetrating subsurface geologic formations and for reflected signal detection by hydrophones or other sensors.

Flex-tensional transducers may be used for actuator 30, or stacks of piezoelectric or magneto-restrictive elements may push selected portions of housing 34 inward or outward. Inflection points on housing 34 permit selective expansion or contraction of housing 34 to facilitate elongation in preferred directions and to produce the desired change in housing 34 volume. As shown in FIG. 4, housing 34 has two concave surface segments 36 and two convex surface segments 38, with four inflection points 40.

In different embodiments of the invention, various forms of the housing may be created to accomplish different functions. Multiple curved or shaped housing segments with multiple inflection points are assembled in three dimensions to produce a shell surface. The generalized form of a shell may be characterized as cylindrical, prismatic, spherical, ellipsoidal, paraboloidal, hyperboloidal, polyhedral, or other shapes. The surface of the generalized shell may be perturbed by changes in the radius or changes in the direction of concavity. For example, the generalized shell shapes of cylinders and spheres can be used, and a generally cylindrical shell shape may be formed by alternating concave and convex shell segments in a radial or axial direction. When the concave and convex segments are aligned parallel to the axis, the shell changes volume by changing cross-sectional area without necessarily changing length. When the convex and concave shell segments alternate along the cylinder axis the shell is able to expand or contract along its length without necessarily changing diameter. If the diameter of the generalized cylinder changes as a function of distance along the axis, the shell may take the form of an ellipsoid or a sphere.

A generally spherical shell housing may have alternating convex and concave curved segments arranged parallel to latitude or longitude. Longitudinal alignment of alternating convex and concave segments facilitates expansion or contraction along lines of latitude. Alternating concave and convex segments aligned with latitude allows the housing to expand and contract along lines of longitude.

Other housing shapes could include combinations of flat, straight, convex, and concave plates configured to form shapes such as prisms of three, four, five or more sides. Polyhedra of four or more sides could also define the general shape of the housing. The surfaces can be crenelated or scalloped with variously curved lobes or projections. As defined herein, the term "crenelated" refers to a housing surface having at least one concave surface adjacent to a convex surface.

Figure 5:
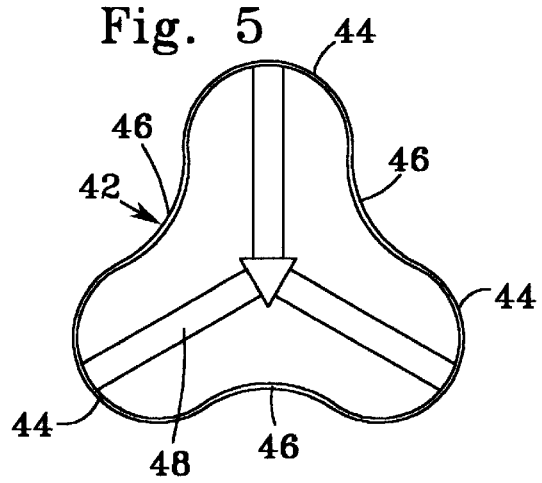
FIG. 5 illustrates a housing having three lobes.
Figure 6:
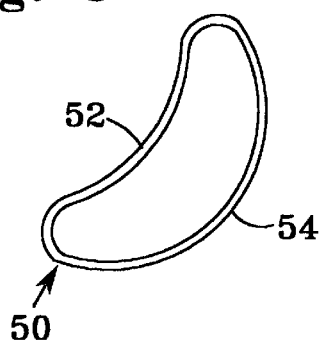
FIG. 6 illustrates an asymmetrical housing having a concave surface and different convex surfaces.

FIG. 5 illustrates one embodiment of the invention wherein housing 42 has three projections, extensions, or lobes 44 formed with exterior convex surfaces. Exterior concave outward surfaces 46 are positioned between each lobe 44, and actuator 48 is illustrated in contact with the interior surface of each lobe 44. Alternatively, in another embodiment of the invention, actuator 48 could be in contact with the interior surface of each concave surface 46. FIG. 6 illustrates housing 50 having concave outward surface 52 and convex surface 54 composed of two or more convex segments of differing radii. Expansion or contraction of housing 50 can occur through concave surface 52, convex surface 54, or both.

Figure 7:
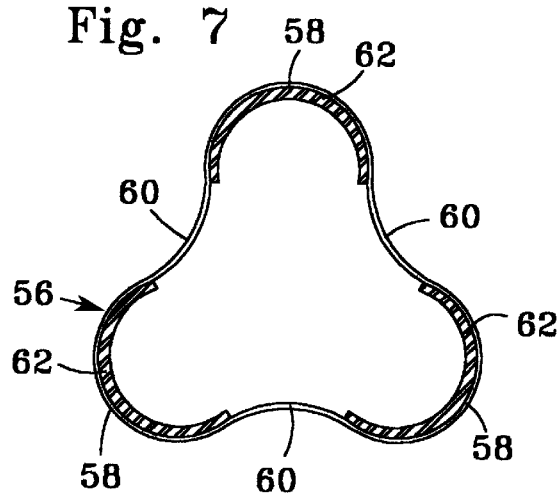
FIG. 7 illustrates a housing having piezoelectric elements on the inside housing surface.
Figure 8:
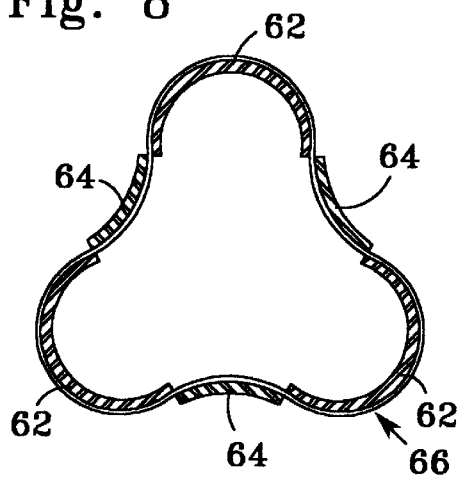
FIG. 8 illustrates a housing having piezoelectric elements on the inside and outside of the housing surface.

FIG. 7 illustrates housing 56 wherein each convex outward segment 58 has the same radius as each concave segment 60. Transducers such as piezoelectric elements 62 are positioned on the interior surfaces of housing 56. FIG. 8 illustrates a similar embodiment wherein piezoelectric elements 64 are also engaged with the exterior, concave outward segments of housing 66. By using curves having the same radius, piezoelectric elements 64 would have the same arc as elements 62, would fit each lobe of housing 66 equally well, and would use only one shape of piezoelectric element.

Figure 9:
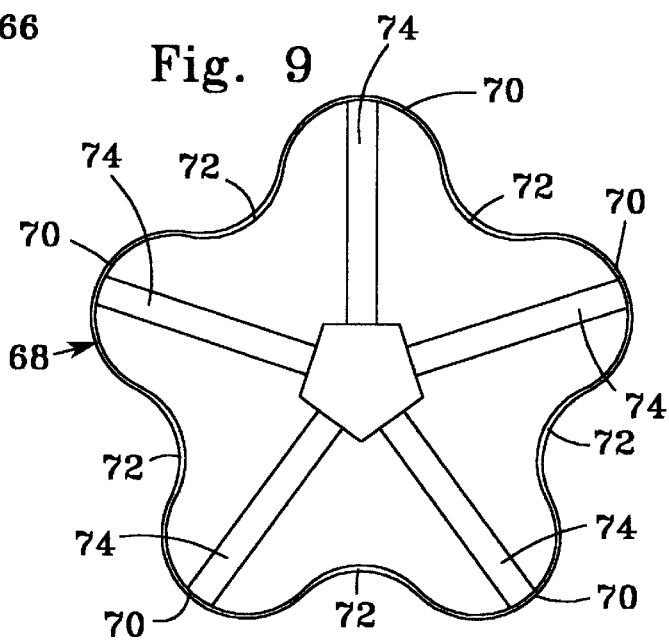
FIG. 9 illustrates a housing having five lobes and linear actuators.

FIG. 9 illustrates housing 68 having five convex outward lobes 70 and five concave housing segments 72. Actuator 74 is engaged with the interior of each convex housing segment 70. Another form of activation is demonstrated in FIG. 10 wherein piezoelectric elements 76 are engaged with each lobe 70 of housing 68.

FIG. 11 illustrates another form of housing 78 wherein three equally sized lobes 70 are engaged with piezoelectric elements 80. The pressure pulse generated by movement of housing 78 will extend in generally equal directions around housing 78. In other embodiments of the invention as described below, the direction of the pressure pulse propagation can be steered in a selected direction.

FIG. 12 illustrates another form of housing 82 having a substantially flat surface 84 and a crenelated surface 86. Surface 86 can provide for significant expansion or contraction due to the combination of the structure and material used. This configuration of the invention is useful in steering the propagation of the pressure pulse.

FIG. 13 illustrates housing 88 having lobes 90, 92, 94, and 96 of different degree and direction of curvatures. Each housing can be formed with segments having different radii or shape for each lobe. By using lobes of different shapes and sizes, unique acoustic source energy forms can be generated. By using differing radius arcs, the transducer formed by each housing can be tuned to have a broader frequency response (and lower Q) than conventional acoustic energy sources. Different actuator shapes would be useful with the differing radius sizes, and the combined frequency ranges for the acoustic energy source pulse can be spread over frequency band larger than is possible with conventional seismic energy sources. The preferred number of housing lobes is two or three lobes having equal or unequal radii, however more lobes can be integrated into a housing to accomplish the desired affect.

The method of the invention is practiced by deploying a housing in the water, by activating an actuator engaged with said housing to flex the housing exterior surface about the housing perimeter to generate a pressure pulse in the water, and by returning said housing exterior surface to the original configuration. In different embodiments, the actuator can comprise a piezoelectric element activatable with electricity. The actuator can comprise at least two piezoelectric elements which are electrically charged with opposite charges to flex portions of the housing in different directions. Separate activation of the piezoelectric elements at different energy levels and at different times can change the flexure of the individual housing segments, and the character of the resulting pressure pulse.

If electric power provides the energy source for activating an actuator within each housing, power transmission can be supplied from a seismic tow vessel through streamers or cables towed by the vessel. The invention can be deployed by selectively operating piezoelectric element or elements with electricity provided by an integrated or remote power source. Movement of the piezoelectric elements moves each housing to generate the acoustic source energy in a low frequency range at a high power level. The reliance upon a simple elastic system in the form of a movable housing substantially eliminates frictional wear, mechanical wear, and abrasion between the operable components. The invention provides an easily towable, reduced friction, dependable seismic energy source. Each housing can be towed through the water or can function as a separate device moving independently of the vessel. The position of each housing can be identified and recorded by global positioning systems ("GPS"), having an antenna located above the water surface, or other positioning equipment (e.g. acoustic, radio, laser, and others) and a controller located in the water, on board the vessel, or at land-based processing facilities.

The present invention uniquely provides an efficient acoustic energy method and source which can be highly controller to provide seismic source energy in marine geophysical operations. The invention permits near point source generation of acoustic source energy, instead of using multiple air gun arrays many tens of meters long and across.

The invention provides numerous advantages over prior art marine seismic source techniques and provides superior signal control from a single element instead of the multistring, multi-gun arrays conventionally used. By providing for solid state actuation of piezoelectric elements and elastic amplification of a housing, the mechanical and electrical simplicity of the invention provides superior performance when compared with conventional systems having complex mechanical components subject to wear, tuning requirements, and complex electrical interfaces. The cost of the invention is significantly less than conventional seismic sources, and the total cost of operation is reduced because of lower drag in water 14 and the increased efficiency over conventional air gun systems. The compact size of the invention reduces deck space required on vessels, and control over the source energy reduces negative impact oil marine life. The selectivity over the frequency content and power of the source energy offers significant processing capabilities not available with conventional systems, and the invention offers the potential for simultaneous, orthogonal pseudo-random sweeps.

The invention provinces unique advantages not provided by conventional seismic source systems. By providing source energy from a single element instead of conventional multi-string, multi-gun arrays, the signal power is superior. By providing a solid state system, the apparatus significantly increases system reliability by eliminating the mechanical and electrical components in conventional source guns.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An acoustic energy source for generating a pressure pulse in water, comprising:
    a housing deployable in the water and having an exterior surface closed about at least one housing perimeter, wherein said housing perimeter has at least two inflection points and said housing is flexible about said housing perimeter to generate a pressure pulse in the water, and wherein said housing exterior surface is generally shaped as a geometric prism; and
    an actuator in communication with said housing for flexing said housing to generate the pressure pulse.

2. An acoustic energy source as recited in claim 1, wherein the surface area of said housing exterior surface does not change when said actuator flexes said housing.

3. An acoustic energy source as recited in claim 1, wherein said housing exterior surface is crenelated.

4. An acoustic energy source as recited in claim 1, wherein said housing is sufficiently resilient to return said exterior surface to the original configuration after said actuator is activated to flex said housing.

5. An acoustic energy source as recited in claim 1, wherein said actuator is engaged with said housing to move said housing inwardly when said actuator is activated.

6. An acoustic energy source as recited in claim 1, wherein said actuator is in communication with said housing to move said housing outwardly when said actuator is activated.

7. An acoustic energy source as recited in claim 1, wherein said actuator comprises a piezoelectric element engaged with said housing.

8. An acoustic energy source as recited in claim 7, wherein said actuator comprises at least two piezoelectric elements engaged with said housing and alternately chargeable with electricity to move different parts of said housing in different directions.

9. An acoustic energy source for generating a pressure pulse in water, comprising:
    a housing deployable in the water and having an exterior surface closed about at least one housing perimeter, wherein said housing perimeter has at least two inflection points and said housing is flexible about said housing perimeter to generate a pressure pulse in the water, and wherein said perimeter has at least one concave surface and at least one convex surface; and
    an actuator in communication with said housing for flexing said housing to generate the pressure pulse.

10. A marine seismic source for exploring geologic formations underlying water, comprising:
    a housing deployable in the water and having an exterior surface closed about a housing perimeter having at least two inflection points, wherein said housing is flexible about said housing perimeter to generate a pressure pulse in the water, and wherein said housing exterior surface is generally shaped as a geometric prism; and
    an electric actuator in communication with said housing for flexing said housing about said housing perimeter to generate the pressure pulse.

11. A seismic source as recited in claim 10, wherein said actuator comprises a piezoelectric element engaged with said housing.

12. A seismic source as recited in claim 10, wherein said actuator comprises at least two piezoelectric elements engaged with said housing and alternatively chargeable with electricity to move different parts of said housing in different directions.

13. A method for generating a pressure pulse in water, comprising the steps of:
    deploying a housing in the water, wherein said housing has an exterior surface closed about at least one housing perimeter, and wherein said perimeter has at least two inflection points;
    activating an actuator in communication with said housing to flex said housing exterior surface about said housing perimeter to generate a pressure pulse in the water, wherein said actuator comprises at least two piezoelectric elements engaged with different housing segments;
    selectively activating said piezoelectric elements to control flexure of said housing segments; and
    returning said housing exterior surface to the original configuration.

14. A method as recited in claim 13, wherein said actuator comprises a piezoelectric element, and wherein said piezoelectric element is activated with electricity.

15. A method as recited in claim 13, wherein said actuator comprises at least two piezoelectric elements, further comprising the step of electrically charging said piezoelectric elements with opposite charges for flexing portions of said housing in different directions.

16. A method as recited in claim 13, wherein said piezoelectric elements are activated at different time intervals.

17. A method for generating a pressure pulse in water, comprising the steps of:

deploying a housing in the water, wherein said housing has an exterior surface closed about at least one housing perimeter, and wherein said perimeter has at least two inflection points;

activating an actuator in communication with said housing to flex said housing exterior surface about said housing perimeter to generate a pressure pulse in the water, wherein said actuator comprises at least two piezoelectric elements engaged with different sides of said housing;

selectively activating each piezoelectric element to control flexure of said housing; and returning said housing exterior surface to the original configuration.

\* \* \* \* \*